(12) United States Patent
Ohsaki

(10) Patent No.: US 9,061,919 B2
(45) Date of Patent: Jun. 23, 2015

(54) MAGNESIUM OXIDE POWDER HAVING EXCELLENT DISPERSIBILITY AND METHOD FOR PRODUCING THE SAME

(71) Applicant: TATEHO CHEMICAL INDUSTRIES CO., LTD., Ako-shi, Hyogo (JP)

(72) Inventor: Yoshihisa Ohsaki, Ako (JP)

(73) Assignee: TATEHO CHEMICAL INDUSTRIES CO., LTD., Hyogo (JP)

(*) Notice: Subject to any disclaimer, the term of this patent is extended or adjusted under 35 U.S.C. 154(b) by 42 days.

(21) Appl. No.: 14/135,824

(22) Filed: Dec. 20, 2013

(65) Prior Publication Data

US 2014/0134097 A1    May 15, 2014

Related U.S. Application Data

(62) Division of application No. 13/499,195, filed as application No. PCT/JP2010/067211 on Oct. 1, 2010, now abandoned.

(30) Foreign Application Priority Data

Oct. 2, 2009 (JP) ................................. 2009-230382

(51) Int. Cl.
 C01F 5/02    (2006.01)
 C01F 5/08    (2006.01)
 C01F 5/22    (2006.01)

(52) U.S. Cl.
 CPC .............. *C01F 5/08* (2013.01); *Y10T 428/2982* (2015.01); *C01F 5/22* (2013.01); *C01P 2002/72* (2013.01); *C01P 2004/51* (2013.01); *C01P 2006/12* (2013.01); *C01P 2006/22* (2013.01)

(58) Field of Classification Search
 USPC .................... 423/155–160, 164, 178
 See application file for complete search history.

(56) References Cited

U.S. PATENT DOCUMENTS

| | | | |
|---|---|---|---|
| 4,298,379 A | 11/1981 | Zambrano | |
| 5,039,509 A | 8/1991 | Miyata et al. | |
| 5,143,965 A | 9/1992 | Mertz | |
| 5,626,825 A * | 5/1997 | Verri | 423/155 |
| 6,569,399 B2 * | 5/2003 | Brasch et al. | 423/636 |
| 6,899,768 B2 | 5/2005 | Toutsuka et al. | |
| 8,512,673 B2 | 8/2013 | Ohsaki et al. | |
| 2010/0266845 A1 | 10/2010 | Ohsaki et al. | |
| 2011/0014469 A1 | 1/2011 | Nakagawa et al. | |
| 2012/0189850 A1 * | 7/2012 | Ohsaki | 428/402 |

FOREIGN PATENT DOCUMENTS

| | | |
|---|---|---|
| CN | 1740269 A | 3/2006 |
| CN | 101475197 A | 7/2009 |
| JP | 55-058331 | 5/1980 |
| JP | 60-176918 A | 9/1985 |
| JP | 2-141418 A | 5/1990 |
| JP | 05-286713 A | 11/1993 |
| JP | 7-101722 A | 4/1995 |
| JP | 7-187613 A | 7/1995 |
| JP | 2003-33159 | 2/2003 |
| JP | 2007-070219 A | 3/2007 |
| JP | 2008-184366 A | 8/2008 |
| JP | 2009-007192 A | 1/2009 |
| JP | 2009-170421 A | 7/2009 |
| WO | 2008/093565 A1 | 8/2008 |

OTHER PUBLICATIONS

Ichiro Koiwa, et al., "A Study on MgO Powders for Protective Layer of AC-PDP", The Transactions of the Institute of Electronics, Information and Communication Engineers C-11, 1995. 11, pp. 534-543, vol. J78-C-11, No. 11.

English translation of Japanese Office Action dated Aug. 27, 2013, Notification of Reasons for Rejection, Patent Application No. 2009-230382 (4 pages).

* cited by examiner

*Primary Examiner* — Holly Le
(74) *Attorney, Agent, or Firm* — Lucas & Mercanti, LLP

(57) ABSTRACT

A magnesium oxide powder having excellent dispersibility and a small average particle diameter as well as a uniform particle diameter and containing no very small size particles is obtained. A magnesium oxide powder which is particles, wherein the magnesium oxide powder has a BET specific surface area of 5 m$^2$/g or more, a cumulative 50% particle diameter ($D_{50}$) obtained in the measurement of laser diffraction scattering particle size distribution of 0.3 to 1.5 μm, a ratio of a cumulative 90% particle diameter ($D_{90}$) to a cumulative 10% particle diameter ($D_{10}$) ($D_{90}/D_{10}$) obtained in the measurement of laser diffraction scattering particle size distribution of 5 or less, and a $D_{10}$ of 0.1 μm or more.

2 Claims, No Drawings

MAGNESIUM OXIDE POWDER HAVING EXCELLENT DISPERSIBILITY AND METHOD FOR PRODUCING THE SAME

This is a Divisional of U.S. patent application Ser. No. 13/499,195 filed Mar. 29, 2012, which was a U.S. National Phase Application under 35 U.S.C. 371 of International Application PCT/JP2010/067211, filed on Oct. 1, 2010, which claims the priority of Japanese Application No. 2009-230382, filed Oct. 2, 2009, the entire content of all Applications are hereby incorporated by reference.

FIELD OF THE INVENTION

The present invention relates to a magnesium oxide powder having excellent dispersibility and a method for producing the same.

BACKGROUND ART

Magnesium oxide powder has been used in refractory, various additives, fillers for resin, optical materials, electronic parts applications, raw materials for fluorescent material, raw materials for various target materials, raw materials for superconductor thin film undercoat, raw materials for tunnel barrier for use in tunnel magnetoresistive element (TMR element), raw materials for protective film for use in color plasma display panel (PDP), catalysts, and the like, and has drawn attention as inorganic materials having a wide variety of applications.

Patent document 1 discloses a high specific surface-area magnesium oxide powder having a BET specific surface area in the range of from 230 to 500 $m^2/g$, wherein 80% by mass or more of the particles constituting the magnesium oxide powder are particles belonging to the undersize of a sieve having a sieve opening of 0.25 mm. Further, patent document 1 has a description that for producing the above magnesium oxide powder, magnesium hydroxide particle powder wherein the magnesium hydroxide particle powder has a BET specific surface area in the range of from 10 to 200 $m^2/g$, wherein more than 20% by mass of the particles constituting the magnesium hydroxide powder are particles belonging to the undersize of a sieve having a sieve opening of 0.25 mm, is calcined by heating at a temperature of 250 to 550° C. under a pressure of 300 Pa or less for 1 to 10 hours.

Patent document 2 discloses that magnesium oxide having a BET specific surface area value of 5 to 150 $m^2/g$ is disintegrated by forcibly passing it in a dry state through a screen having a screen opening of 70 to 200 μm to produce magnesium oxide, the secondary particles of which have a cumulative 50% particle diameter of 2 μm or less.

Patent document 3 discloses that a magnesium oxide precursor is calcined in a closed system in the presence of halogenide ions in an amount of 0.5 to 30% by mass relative to the total mass of the precursor, to produce a magnesium oxide powder having a shape of cube and having a cumulative 5.0% particle diameter ($D_{50}$) of 1.0 μm or more obtained in the measurement of laser diffraction scattering particle size distribution.

PRIOR ART REFERENCES

Patent Documents

Patent document 1: Japanese Unexamined Patent Publication No. 2007-070219

Patent document 2: Japanese Unexamined Patent Publication No. Hei 5-286713
Patent document 3: Japanese Unexamined Patent Publication 2008-184366

SUMMARY OF THE INVENTION

Problems to be Solved by the Invention

When the magnesium oxide powder is used in the applications of optical materials, electronic materials, catalysts, and the like, the magnesium oxide powder is desired to have the following properties. Specifically, in an example of the applications of optical materials, the magnesium oxide powder is used as a light diffuser for liquid crystal monitor and a refractive index adjustor for LED sealing resin. In such an application of optical materials, a magnesium oxide powder having excellent dispersibility and a small average particle diameter as well as excellent thermal conductivity is desired. In electronic materials, a high-purity magnesium oxide powder having excellent dispersibility and a small average particle diameter and containing no very small size particles is desired. In catalysts, a magnesium oxide powder having excellent dispersibility, containing no very small size particles, and exhibiting high reactivity is desired. Therefore, when used in the applications of optical materials, electronic materials, catalysts, and the like, the magnesium oxide powder is desired to have excellent dispersibility and a small average particle diameter as well as a uniform particle diameter and contain no very small size particles.

With respect to the magnesium oxide powder described in patent document 1, the particle size distribution of the powder of magnesium oxide is not controlled in its production. For this reason, the produced magnesium oxide powder contains fine particles of submicron or less, and when this magnesium oxide powder is incorporated to a material, such as a resin, the magnesium oxide powder is likely to coagulate to cause relatively large particles in an aggregate form. Further, this magnesium oxide powder contains also coarse particles. Therefore, the magnesium oxide powder described in patent document 1 has a problem about the dispersibility of powder.

With respect to the magnesium oxide powder obtained by a disintegration treatment using the method for producing magnesium oxide powder described in patent document 2, the dispersibility is improved to some extent, but the particle diameter is not uniform. For this reason, when the magnesium oxide powder described in patent document 2 is used in forming a thin film as an electronic material or the like, there is a possibility that the thickness of the resultant film is not uniform. Further, when the magnesium oxide powder is used in a light diffuser of an optical material or the like, a problem in that the diffusion efficiency is low, or the like arises.

The magnesium oxide powder obtained by the method for producing magnesium oxide powder described in patent document 3 has excellent dispersibility, but has a problem in that the powder has a low specific surface area such that the reactivity of the powder is poor. For this reason, when the magnesium oxide powder described in patent document 3 is used in a catalyst or the like, a problem in that a satisfactory reactivity cannot be obtained, or the like arises.

Accordingly, an object of the present invention is to obtain a magnesium oxide powder having excellent dispersibility and a small average particle diameter as well as a uniform particle diameter and containing no very small size particles and a method for producing the same.

Means to Solve the Problems

The present invention is directed to a magnesium oxide powder wherein the magnesium oxide powder has a BET specific surface, area of 5 m²/g or more, a cumulative 50% particle diameter ($D_{50}$) obtained in the measurement of laser diffraction scattering particle size distribution of 0.3 to 1.5 µm, a ratio of a cumulative 90% particle diameter ($D_{90}$) to a cumulative 10% particle diameter ($D_{10}$) ($D_{90}/D_{10}$ ratio) obtained in the measurement of laser diffraction scattering particle size distribution of 5 or less, and $D_{10}$ of 0.1 µm or more. This magnesium oxide powder is a magnesium oxide powder having excellent dispersibility and a small average particle diameter as well as a uniform particle diameter and containing no very small size particles.

Preferred embodiments of the magnesium oxide powder of the present invention art shown below. In the present invention, these embodiments can be appropriately combined.

(1) The magnesium oxide powder has the value of a half width of the X-ray intensity peak ascribed to the (111) plane diffraction of the magnesium oxide powder of 0.1 to 1 degree when a diffraction X-ray intensity with respect to a diffraction angle (2θ) of the magnesium oxide powder is measured by powder X-ray diffractometry using a Cu—Kα ray. When the width of the half value is in the range of from 0.1 to 1 degree, the magnesium oxide powder having a relatively small strain in the crystal structure and having high reactivity can be obtained.

(2) The magnesium oxide powder has an activity of 20 to 2,000 seconds. The magnesium oxide powder having an activity in the range of from 20 to 2,000 seconds is considered to have an appropriate reactivity.

(3) The magnesium oxide powder has a chlorine content of 500 ppm by mass or less. When high-purity magnesium hydroxide as a raw material has a chlorine content of 500 ppm by mass or less, magnesium oxide particles in a shape of cube are unlikely to be formed in the production process of magnesium oxide powder. Accordingly, the magnesium oxide powder obtained by calcining such high-purity magnesium hydroxide as a raw material also has a chlorine content of 500 ppm by mass or less.

(4) The particles of the magnesium oxide powder have the shell of particles of high-purity magnesium hydroxide as a raw material. Therefore, by controlling the shape of the high-purity magnesium hydroxide particles as a raw material, the shape of the particles of the magnesium oxide powder can be controlled.

(5) The magnesium oxide powder has a purity of 99.9% by mass or more. The magnesium oxide powder of the present invention has a high, and therefore the magnesium oxide powder of the present invention can be advantageously used in various applications, e.g., electronic materials, optical materials, such as a light diffuser, and catalysts for waste water treatment, waste gas treatment, or the like.

Further, the present invention is directed to a method for producing the above-mentioned magnesium oxide powder. Specifically, the method of the present invention comprises a step (A) for providing a purified magnesium hydroxide slurry. Further, the method of the present invention comprises a step (B) for maintaining the purified magnesium hydroxide slurry at a temperature of 50 to 200° C. with stirring for 0.5 to 4 hours to perform a heat stirring treatment. Further, the method of the present invention comprises a step (C) for subjecting the heat stirring-treated first magnesium hydroxide slurry to filtration and washing with water to obtain a first magnesium hydroxide cake. Further, the method of the present invention comprises a step (D) for adding to the first magnesium hydroxide cake pure water in an amount of 5 to 100 times relative to the mass base amount of a dry magnesium hydroxide contained in the first magnesium hydroxide cake, and stirring the cake in the pure water to prepare a second magnesium hydroxide slurry, and subjecting the prepared magnesium hydroxide slurry to filtration and washing with water to obtain a second magnesium hydroxide cake. Further, the method of the present invention comprises a step (E) for repeating the step (D) further 1 to 20 times using the second magnesium hydroxide cake as a starting material instead of the first magnesium hydroxide cake to obtain a high-purity magnesium hydroxide cake. Further, the method of the present invention comprises a step (F) for dehydrating the high-purity magnesium hydroxide cake to obtain high-purity magnesium hydroxide having a purity of 99.9% by mass or more and containing chlorine in an amount of 500 ppm by mass or less. Further, the method of the present invention comprises a step (G) far increasing the temperature of the high-purity magnesium hydroxide in an air atmosphere at a temperature elevation rate of 2 to 20° C./minute and calcining the high-purity magnesium hydroxide in the air atmosphere at 500 to 1,500° C. for 0.2 to 5 hours to obtain a magnesium oxide powder. By the method of the present invention, a magnesium oxide powder having excellent dispersibility and a small average particle diameter as well as a uniform particle diameter and containing no very small size particles can be produced.

In the method for producing a magnesium oxide powder of the present invention, the purified magnesium hydroxide slurry in the step (A) is preferably produced by a method comprising the following steps. Specifically, the step for providing the purified magnesium hydroxide slurry preferably comprises the steps: providing an aqueous solution of magnesium chloride; adding an aqueous alkali solution to the aqueous solution of magnesium chloride so that the reaction rate of magnesium chloride becomes 5 to 30 mol % and effecting a reaction to obtain a slurry comprising magnesium hydroxide and other impurities; adding a coagulant to the slurry comprising magnesium hydroxide and other impurities and subjecting or causing the magnesium hydroxide containing the impurities to filtration or to coagulation settling to obtain an aqueous solution of purified magnesium chloride in the form of a filtrate or a supernatant; and adding an aqueous alkali solution to the aqueous solution of purified magnesium chloride so that the reaction rate of magnesium chloride becomes 50 to 100 mol % and effecting a reaction to obtain the purified magnesium hydroxide slurry. By using the above-mentioned method for producing the purified magnesium hydroxide slurry, the production of the purified magnesium hydroxide slurry having a high purity can be surely and relatively easily achieved.

Effect of the Invention

By the present invention, a magnesium oxide powder having excellent dispersibility and a small average particle diameter as well as a uniform particle diameter and containing no very small size particles and a method for producing the same can be obtained.

MODE FOR CARRYING OUT THE INVENTION

The present invention is a method for producing a magnesium oxide (MgO) powder having excellent dispersibility and a small average particle diameter as well as a uniform particle diameter and containing no very small size particles and a magnesium oxide powder produced by the method. Hereinbelow, the magnesium oxide powder of the present invention and the method for producing the same will be described in detail.

The magnesium oxide powder of the present invention is first described in Detail. A characteristic feature of the magnesium oxide powder of the present invention resides in that the magnesium oxide powder has a predetermined BET specific surface area and a predetermined particle diameter, such as a cumulative 50% particle diameter ($D_{50}$) obtained in the measurement of laser diffraction scattering particle size distribution.

The magnesium oxide powder of the present invention has a specific surface area as measured by a BET method (BET specific surface area) of 5 $m^2/g$ or more, preferably 10 to 200 $m^2/g$, more preferably 13 to 160 $m^2/g$. When the magnesium oxide powder of the present invention has a BET specific surface area in such a predetermined range, excellent dispersibility can be obtained.

The magnesium oxide powder of the present invention has a cumulative 50% particle diameter ($D_{50}$) obtained in the measurement of laser diffraction scattering particle size distribution of 0.3 to 1.5 μm. The cumulative 50% particle diameter ($D_{50}$) obtained in the measurement of laser diffraction scattering particle size distribution indicates a particle diameter corresponding to smaller cumulative 50% based on the mass of the particle diameter among the particle diameters measured by using an apparatus for measurement of laser diffraction scattering particle size distribution. The cumulative 50% particle diameter ($D_{50}$) is considered to correspond to an average particle diameter, and therefore, when the cumulative 50% particle diameter ($D_{50}$) is 0.3 to 1.5 μm, a small average particle diameter and excellent dispersibility can be achieved.

The magnesium oxide powder of the present invention has a ratio of a cumulative 90% particle diameter ($D_{90}$) to a cumulative 10% particle diameter ($D_{10}$) ($D_{90}/D_{10}$ ratio) obtained in the measurement of laser diffraction scattering particle size distribution of 5 or less, preferably in the range of from 3 to 5. The cumulative 10% particle diameter ($D_{10}$) and cumulative 90% particle diameter ($D_{90}$) obtained in the measurement of laser diffraction scattering particle size distribution indicate particle diameters respectively corresponding to smaller cumulative 10% by mass and smaller cumulative 90% based on the mass of the particle diameter among the particle diameters measured by using an apparatus for measurement of laser diffraction scattering particle size distribution. The fact that the $D_{90}/D_{10}$ ratio is a low value means that the particle size distribution is narrow (the particle size distribution is sharp and the particle diameter is uniform). Therefore, when the $D_{90}/D_{10}$ is 5 or less, preferably in the range of from 3 to 5, the magnesium oxide powder has a narrow particle size distribution and there is little coagulation, thus achieving excellent dispersibility.

The magnesium oxide powder of the present invention has a $D_{10}$ of 0.1 μm or more, preferably 0.2 μm or more, more preferably in the range of from 0.2 to 0.7 μm. The fact that the $D_{10}$ is larger than such a predetermined value indicates that less particles (A very small size are contained. Therefore, when the $D_{10}$ is 0.1 μm or more, preferably 0.2 μm or more, more preferably in the range of from 0.2 to 0.7 μm, excellent dispersibility can be further more surely achieved.

Further, the magnesium oxide powder of the present invention has the value of a half width of the X-ray intensity peak ascribed to the (111) plane diffraction of the magnesium oxide powder of in the range of from 0.1 to 1 degree, preferably in the range of from 0.2 to 0.7 degree when a diffraction X-ray intensity with respect to a diffraction angle (2θ) is measured by powder X-ray diffractometry using a Cu—Kα ray. The fact that the value of a half width of the X-ray intensity peak ascribed to the (111) plane diffraction of the magnesium oxide powder is small and in such a predetermined range means that the distribution of lattice spacing of the (111) plane is small, and that the strain in the crystal structure of the particles constituting the magnesium oxide powder is small. When the strain in the crystal structure is too small, the crystalline properties of the magnesium oxide particles are improved, so that the reactivity is lowered. Therefore, when the width of a half value of the diffraction X-ray intensity peak is in the above range, the magnesium oxide powder having excellent dispersibility and high reactivity can be more surely obtained.

Further, the magnesium oxide powder of the present invention has an activity in the range of from 20 to 2,000 seconds, preferably in the range of from 40 to 1,000 seconds. The "activity" is determined as follows. 2.02 g of magnesium oxide is weighed so that 100 ml of a 0.4 N aqueous solution of citric acid corresponds to 40% of the amount required for neutralizing the magnesium oxide, and the magnesium oxide powder is added to the aqueous solution of citric acid while stirring. The activity indicates a period of time until all the citric acid has been reacted with the magnesium oxide, namely, a period of time until the pH has reached more than 7. Therefore, the magnesium oxide powder having an activity in the above range is considered to have an appropriate reactivity.

Further, the magnesium oxide powder of the present invention has a chlorine content of 500 ppm by mass or less, preferably 300 ppm by mass or less, more preferably 200 ppm by mass or less, and may contain no chlorine. Further, when high-purity magnesium hydroxide as a raw material has a chlorine content of 500 ppm by mass or less, preferably 300 ppm by mass or less, more preferably 200 ppm by mass or less, magnesium oxide particles in a shape of cube, which cause the dispersibility of powder to be poor, are unlikely to be formed in the production process of magnesium oxide powder. Therefore, a magnesium oxide powder having excellent dispersibility and a small average particle diameter as well as a uniform particle diameter and containing no very small size particles can be obtained. The obtained magnesium oxide powder has also a chlorine content of 500 ppm by mass or less, preferably 300 ppm by mass or less, more preferably 200 ppm by mass or less.

The particles of the magnesium oxide powder of the present invention can have the skeleton of particles of high-purity magnesium hydroxide as a raw material. Therefore, by controlling the shape of the high-purity magnesium hydroxide particles as a raw material, the shape of the particles of the magnesium oxide powder can be controlled.

The magnesium oxide powder of the present invention has a purity of 99.9% by mass or more. Therefore, the magnesium oxide powder of the present invention can be advantageously used in various applications, e.g., electronic materials, optical materials, such as a light diffuser, and catalysts for waste water treatment, waste gas treatment, or the like.

In the present specification, the "purity" can be determined as a value obtained by subtracting the sum of the masses of impurity elements to be measured from 100% by mass. The impurity elements to be measured include Ag, Al, B, Ba, Bi, Cd, Cl, Co, Cr, Cu, Fe, Ga, In, K, Li, Mg, Mn, Na, Ni, P, Pb, S, Si, Sr, Tl, V, Zn, and Zr.

Next, the method for producing a magnesium oxide powder of the present invention is described. A characteristic feature of the method for producing a magnesium oxide powder of the present invention resides in that high-purity magnesium hydroxide having reduced chlorine content is produced by performing predetermined filtration and washing with water and the produced high-purity magnesium hydroxide is used as a raw material and calcined under predetermined calcination conditions. By the method for producing a magnesium oxide powder of the present invention, there can be produced a magnesium oxide powder wherein the magnesium oxide powder has a BET specific surface area of 5 m²/g or more, a cumulative 50% particle diameter ($D_{50}$) obtained in the measurement of laser diffraction scattering particle size distribution of 0.3 to 1.5 μm; a ratio of a cumulative 90% particle diameter ($D_{90}$) to a cumulative 10% particle diameter ($D_{10}$) ($D_{90}/D_{10}$ ratio) obtained in the measurement of laser diffraction scattering particle size distribution of 5 or less, and a $D_{10}$ of 0.1 μm or more.

The method for producing a magnesium oxide powder of the present invention comprises a step (A) for providing a purified magnesium hydroxide slurry. The purified magnesium hydroxide slurry means a slurry comprising magnesium hydroxide having a purity of 99% by mass or more, preferably a purity of 99.9% by mass or more.

In the method for producing a magnesium oxide powder of the present invention, with respect to the method for producing the purified magnesium hydroxide slurry, there is no particular limitation. From the viewpoint of surely and relatively easily obtaining the purified magnesium hydroxide slurry having a high purity, it is preferred that the purified magnesium hydroxide slurry is produced by the method descried below.

A preferred method for producing the purified magnesium hydroxide slurry comprises a step far providing an aqueous solution of magnesium chloride. The aqueous solution of magnesium chloride can be selected from the aqueous solution of magnesium chloride hexahydrate, magnesium chloride dihydrate, anhydrous magnesium chloride, bittern, sea water, and the like and combinations thereof. From the viewpoint of surely advancing the below-mentioned reaction, the concentration of the aqueous solution of magnesium chloride is adjusted to 0.5 to 10 mol/L, preferably 0.7 to 5 mol/L, more preferably 1 to 3 mol/L.

The preferred method for producing the purified magnesium hydroxide slurry comprises next a step for adding an aqueous alkali solution to the aqueous solution of magnesium chloride so that the reaction rate of magnesium chloride becomes 5 to 30 mol %, preferably 15 to 25 mol %, specifically 20 mol %, and effecting a reaction to obtain a slurry comprising magnesium hydroxide and other impurities. The aqueous alkali solution can be selected trim an aqueous solution of sodium hydroxide, an aqueous solution of calcium hydroxide, aqueous ammonia, and the like and combinations thereof. From the viewpoint of surely advancing the reaction, the concentration of the aqueous alkali solution is adjusted to 5 to 50 mol/L, preferably 10 to 30 mol/L, more preferably 15 to 20 mol/L.

The preferred method for producing the purified magnesium hydroxide slurry comprises next a step for adding a coagulant to the slurry comprising magnesium hydroxide and other impurities and subjecting or causing the magnesium hydroxide containing the impurities to filtration or to coagulation settling to obtain an aqueous solution of purified magnesium chloride in the form of a filtrate or a supernatant. The coagulant can be appropriately selected from coagulants comprised mainly of an acrylamide-sodium acrylate copolymer, an acrylamide-acrylamide-sodium 2-methylpropanesulfonate copolymer, a polyacrylamide, an alkylaminomethacrylate quaternary salt polymer, an alkylaminonacrylate quaternary salt-acrylamide copolymer, and/or a polyamidine hydrochloride. The amount of the coagulant added can be about 100 to 1,000 ppm by mass, specifically about 500 ppm by mass, based on the weight of the formed magnesium hydroxide. Most of the impurities are adsorbed on the magnesium hydroxide which is subjected to filtration or caused to coagulation settling, and therefore an aqueous solution of purified magnesium chloride containing less impurity can be obtained in the form of a filtrate or a supernatant.

The preferred method for producing the purified magnesium hydroxide slurry then comprises a step for adding an aqueous alkali solution to the aqueous solution of purified magnesium chloride so that the reaction rate of magnesium chloride becomes 50 to 100 mol %, preferably the reaction rate becomes 70 to 95 mol %, specifically the reaction rate becomes 90 mol %, and effecting a reaction to obtain the purified magnesium hydroxide slurry. By controlling the reaction rate as mentioned above, the high-purity magnesium hydroxide slurry can be obtained in high yield.

In the step for obtaining the purified magnesium hydroxide slurry, the concentration of the aqueous solution of purified magnesium chloride is adjusted to 0.5 to 10 mol/L, preferably 0.7 to 5 mol/L, more preferably 1 to 3 mol/L. The aqueous alkali solution can be selected from an aqueous solution of sodium hydroxide, an aqueous solution of calcium hydroxide, aqueous ammonia, and the like and combinations thereof. From the viewpoint of surely advancing the reaction, the concentration of the aqueous alkali solution is adjusted to 5 to 50 mol/L, preferably 10 to 30 mol/L, more preferably 15 to 20 mol/L. From the viewpoint of obtaining a magnesium oxide powder having a high purity, it is preferred that the purity of each of the aqueous solution of purified magnesium chloride and the aqueous alkali solution is 99.9% by mass or more.

The method for producing a magnesium oxide powder of the present invention comprises a step (B) for maintaining the above-provided purified magnesium hydroxide slurry with stirring, at a temperature of 50 to 200° C., preferably 90 to 200° C., for 0.5 to 4 hours, preferably 1 to 3 hours, specifically for 2 hours, to perform a heat stirring treatment. The heat stirring treatment means a treatment in which the purified magnesium hydroxide slurry is heated to a predetermined temperature under the above-mentioned conditions and stirred for a predetermined period of time. When the heating temperature is 100° C. or higher, it is preferred that the heat stirring treatment is conducted by performing a hydrothermal treatment with stirring. In this case, the hydrothermal treatment can be performed using a known method. By subjecting the purified magnesium hydroxide slurry to predetermined heat stirring treatment, the magnesium hydroxide particles having too small particle diameter can be dissolved and recrystallized, making it possible to obtain magnesium hydroxide having a uniform average particle diameter and containing no very small size particles. That is, by performing the heat stirring treatment wider the predetermined conditions, the shape of the magnesium hydroxide particles can be controlled to be a desired shape. As an apparatus for the heat stirring treatment, there can be used an autoclave which can stir the treating solution during the hydrothermal treatment. In the present specification, the heat stirring-treated magnesium hydroxide slurry is referred to as "first magnesium hydroxide slurry".

The method for producing a magnesium oxide powder of the present invention then comprises a step (C) for subjecting the heat stirring-treated first magnesium hydroxide slurry to filtration and washing with water to obtain a magnesium hydroxide cake. In the present specification, the magnesium hydroxide cake obtained in the step (C) is referred to as "first magnesium hydroxide cake". The filtration for the first magnesium hydroxide slurry can be performed by a known method using filter paper or the like. The washing with water can be conducted by adding pure water in an amount of 5 to 100 times relative to a mass base amount of the dry magnesium hydroxide after the filtration. The pure water added for the washing with water is subjected to filtration using filter paper or the like, and therefore most of the moisture is removed, so that a first magnesium hydroxide cake can be obtained.

The method for producing a magnesium oxide powder of the present invention comprises then a step (D) for adding to the first magnesium hydroxide cake pure water in an amount of 5 to 100 times relative to a mass base amount of the dry magnesium hydroxide of the first magnesium hydroxide cake, and stirring the cake in the pure water to prepare a second magnesium hydroxide slurry, and subjecting the second magnesium hydroxide slurry to filtration and washing with water to obtain a second magnesium hydroxide cake. The cleaning conducted in the step (D) in which a solvent, such as pure water, is added to the cake and stirred and subjected to filtration and washing with water to obtain a cake is referred to as "repulping cleaning". The "second magnesium hydroxide slurry" means the magnesium hydroxide slurry being subjected to repulping cleaning. The "second magnesium hydroxide cake" means the magnesium hydroxide cake obtained by the repulping cleaning. The repulping cleaning can reduce the impurities deposited on the surfaces of the magnesium hydroxide particles, particularly chlorine.

Specifically, in the repulping cleaning of the step (D), the first magnesium hydroxide cake is transferred to a vessel, and pure water is added to the cake in a predetermined amount relative to a mass base amount of the dry magnesium hydroxide, followed by stirring. From the viewpoint of ensuring the reduction of impurities and achieving the reduction of cost and the resource savings, the amount of the pure water used in the step (D) can be 5 to 100 times, preferably 20 to 80 times, more preferably 30 to 60 times relative to a mass base amount of the dry magnesium hydroxide of the first magnesium hydroxide cake. The stirring of the second magnesium hydroxide slurry can be conducted using a stirring machine. The stirring speed can be controlled to a speed such that the second magnesium hydroxide slurry is satisfactorily mixed, and, for example, the slurry can be stirred at a rotational speed of about 500 rpm. The stirring time can be appropriately selected. From the viewpoint of ensuring the reducing of impurities and enabling the production in a short period of time, the stirring time can be 0.3 to 3 hours, preferably 0.5 to 2 hours, specifically about one hour. The temperature for the stirring can be appropriately selected, but it is preferred that the stirring is conducted at room temperature because no heater is required.

In the repulping cleaning of the step (D), the second magnesium hydroxide slurry obtained after the stirring is then subjected to filtration using filter paper or the like to remove most of the moisture, and pure water in an amount of 5 to 100 times relative to a mass base amount of the dry magnesium hydroxide is added to the slurry obtained after the filtration to wash the slurry with water, obtaining a second magnesium hydroxide cake. The pure water added for the washing with water is subjected to filtration using filter paper or the like, and therefore most of the moisture is removed, so that a second magnesium hydroxide cake in a cake form can be obtained.

The method for producing a magnesium oxide powder of the present invention then comprises, in addition to the above-mentioned repulping cleaning of the step (D), a step (E) repeating the repulping cleaning similar to the step (D) 1 to 20 times, preferably 5 to 15 times using the second magnesium hydroxide cake obtained in the step (D) as a starting material instead of the first magnesium hydroxide cake to obtain a high-purity magnesium hydroxide cake. That is, it is necessary that the repulping cleaning be performed 2 or more times in total in the steps (D) and (E). The step (D) can ensure the reduction or the impurities deposited on the surfaces of the magnesium hydroxide particles, particularly chlorine. As a result, by the step (E), a high-purity magnesium hydroxide cake can be obtained. From the viewpoint of ensuring the reduction of the impurities in the high-purity magnesium hydroxide cake and achieving the redaction of cost and the resource savings, the number of the repetition times of the washing with water and filtration can be 2 to 20, preferably 5 to 15.

The method for producing a magnesium oxide powder of the present invention then comprises a step (F) dehydrating the high-purity magnesium hydroxide cake to obtain high-purity magnesium hydroxide having a purity of 99.9% by mass or more and containing chlorine in an amount of 500 ppm by mass or less. The dehydration can be performed by a known method.

In the method of the present invention, the high-purity magnesium hydroxide obtained in the step (F) has a chlorine content of 500 ppm by mass or less, preferably 300 ppm by mass or less, more preferably 200 ppm by mass or less. By controlling the content of chlorine in the raw materials, water, and the like used in the steps (A) to (E) prior to the step (F) and the number of the repetition of the repulping cleaning in the above-mentioned step (E), the chlorine content of the high-purity magnesium hydroxide can be in a predetermined range. When the chlorine content of the high-purity magnesium hydroxide is more than 500 ppm by mass, sintering is promoted in the subsequent calcination step, so that magnesium oxide particles in a shape of cube having a small BET specific surface area are disadvantageously grown. Therefore, the chlorine content of the high-purity magnesium hydroxide is required to be 500 ppm by mass or less. Further, from the viewpoint of surely preventing the growth of particles having a small BET specific surface area and achieving the reduction of cost, the chlorine content of the high-purity magnesium hydroxide is preferably 300 ppm by mass or less, more preferably 200 ppm by mass or less.

In the method of the present invention, the high-purity magnesium hydroxide obtained in the step (F) has a purity of 59.9% by mass or more. By controlling the content of impurities in the raw materials, water, and the like used in the steps (A) to (E) prior to the step (F), the purity of the high-purity magnesium hydroxide can be in a predetermined range. When the purity of the high-purity magnesium hydroxide is low, crystals or magnesium oxide are not satisfactorily grown during the calcination, so that particles in a large aggregate form having no sharp particle size distribution are formed, or coarse crystals are formed during the calcination. Therefore, the high-purity magnesium hydroxide obtained in the present step preferably has a purity of 99.9% by mass or more.

The method for producing a magnesium oxide powder of the present invention then comprises a step (G) increasing the temperature of the high-purity magnesium hydroxide obtained in the above-mentioned step in an air atmosphere at a temperature elevation rate of 2 to 20° C./minute, preferably 3 to 10° C./minute, more preferably 4 to 8° C./minute, specifically at 6° C./minute and calcining the high-purity magnesium hydroxide in the air atmosphere at a calcination temperature of 500 to 1,500° C., preferably 600 to 1,300° C., for 0.2 to 5 hours, preferably for 0.5 to 2 hours, to obtain a magnesium oxide powder.

The lower the calcination temperature, the larger the BET specific surface area of the obtained magnesium oxide powder. However, when the calcination temperature is lower than 500° C., there is a possibility that all the magnesium hydroxide is not converted to magnesium oxide and part of the magnesium hydroxide remains unreacted. On the other hand, when the calcination temperature is higher than 1,500° C., sintering is promoted, and therefore there is a possibility that magnesium oxide in a shape of cube having a small BET specific surf area is formed. Therefore, the calcination temperature for the magnesium hydroxide is 500 to 1,500° C., preferably 600 to 1,300° C. Further, for the same reason, in the step (G), the calcination time for the high-purity magnesium hydroxide is 0.2 to 5 hours, preferably 0.5 to 2 hours.

By the above-mentioned method, there can be produced a magnesium oxide powder having a predetermined BET specific surface area and a predetermined particle diameter, such as a cumulative 50% particle diameter ($D_{50}$) obtained in the measurement of laser diffraction scattering particle size distribution. Further, by appropriately controlling the conditions for calcination, the particles of the magnesium oxide powder of the present invention can have the skeleton of particles of high-purity magnesium hydroxide as a raw material.

The magnesium oxide powder of the present invention produced by the method of the present invention is a magnesium oxide powder having excellent dispersibility, an average particle diameter as small as about 0.3 to 1.5 µm, and a uniform particle diameter and containing almost no very small size particles of about 0.1 µm or less. Therefore, the magnesium oxide powder of the present invention has excellent dispersibility, high light diffusion effect, high reactivity, high specific surface area, and sharp particle size distribution, and hence can be advantageously used in various applications, e.g., electronic materials, optical materials, such as a light diffuser, and catalysts for waste water treatment, waste gas treatment, or the like. The magnesium oxide powder of the present invention can be specifically used in the applications of raw materials for separator heat-resistant layer for use in lithium-ion battery, ink fixing agents for inkjet paper, the improvement of film sheet (improvement of the heat resistance or flexing properties), fillers added to resins, ceramics for fuel cell, raw materials for fluorescent material, refractive index adjustors for LED sealing resin, light diffusers, ceramic sintering aids, and the like.

EXAMPLES

The present invention will be described in more detail with reference to the following Examples, which should not be construed as limiting the scope of the present invention.

In the following Examples, various physical properties and the like were measured in accordance with the procedures shown below.

(1) Measurement of Laser Diffraction Scattering Particle Size Distribution

Using an apparatus for measurement of laser diffraction scattering particle size distribution (trade name: MT 3300; manufactured by NIKKISO CO., LTD.), a cumulative 10% particle diameter ($D_{10}$), a cumulative 50% particle diameter ($D_{50}$), and a cumulative 90% particle diameter ($D_{90}$) were measured.

(2) Method for Measuring a BET Specific Surface Area

Using an apparatus for measuring a specific surface area (trade name: Macsorb 1210; manufactured by Mountech Co., Ltd.), a specific surface area was measured by a gas adsorption method.

(3) Method for Measuring a Purity

A purity of magnesium hydroxide was determined as a value obtained by subtracting the sum of the masses of impurity elements measured by the below-mentioned "Method for measuring masses of impurity elements in magnesium hydroxide" from 100% by mass.

(4) Method for Measuring Masses of Impurity Elements in Magnesium Hydroxide

With respect to impurity elements to be measured (Ag, Al, B, Ba, Bi, Cl, Co, Cr, Cu, Fe, Ga, In, K, Li, Mg, Mn. Na, Ni, P, Pb, S, Si, Sc, Tl, V, Zn, and Zr), sample was dissolved in an acid and then, masses were measured using an ICP Optical Emission Spectrometer (trade name: SPS-1700; manufactured by Seiko instruments Inc.).

(5) Method for Measuring an Activity 2.02 g of magnesium oxide was weighed so that 100 ml of a 0.4 N aqueous solution of citric acid corresponded to 40% of the amount required for neutralizing the magnesium oxide, and the magnesium oxide powder was added to the aqueous solution of citric acid with stirring, and a period of time until all the citric acid had been reacted with the magnesium oxide, namely, a period of time until the pH had reached more than 7 was measured.

(6) Method for Measuring the Value of a Half Width

Using Rigaku RINT-1400 X-Ray Diffractometer (manufactured by Rigaku Corporation) as an X-ray diffractometer, a magnesium oxide powder sample was subjected to measurement by powder X-ray diffractometry using a Cu—Kα ray, and, using an analysis soft (trade name: JADE 6; manufactured by Rigaku Corporation), with respect to a peak around $2\theta=36.9$ degrees ascribed to the (111) plane, a peak around $2\theta=4.29$ degrees ascribed to the (200) plane, and a peak around $2\theta=62.3$ degrees ascribed to the (220) plane, the value of a half width of each peak was determined by calculation.

Example 1

An aqueous solution of magnesium chloride having a purity of 90% by mass or more and a concentration of 3.5 mol/L was prepared. The concentration of the aqueous solution was adjusted by adding pure water (water purified by passing it through an ion-exchange resin so that the electric conductivity became 0.1 µS/cm or less) so that the aqueous solution of magnesium chloride had a concentration of 2.1 mol/L.

Then, an aqueous solution of sodium hydroxide having a concentration of 17.84 mol/L was added to the aqueous solution of magnesium chloride having a concentration of 2.1 mol/L so that the reaction rate became 20 mol % to effect a reaction, and further a coagulant was added thereto. As the coagulant, an acrylamide-sodium acrylate copolymer was used, and the amount of the coagulant added was 500 ppm by mass, based on the mass of the formed magnesium hydroxide. As a result, the magnesium hydroxide formed by the reaction was coagulated and settled. The supernatant was removed from the resultant solution to obtain an aqueous solution of purified magnesium chloride.

The concentration of the aqueous solution of purified magnesium chloride was adjusted so that the aqueous solution of purified magnesium chloride had a concentration of 2.1 mol/L. The resultant aqueous solution of purified magnesium chloride was reacted with an aqueous solution of sodium hydroxide having a concentration of 17.84 mol/L so that the reaction rate became 90% to prepare a purified magnesium hydroxide slurry.

The prepared purified magnesium hydroxide slurry was maintained at 150° C. with stirring using an autoclave for 2 hours to perform a hydrothermal treatment (heat stirring treatment). The hydrothermal-treated first magnesium hydroxide slurry was subjected to filtration and washed with water to obtain a first magnesium hydroxide cake. The washing with water was conducted by adding pure water in an amount of 40 times relative to the mass base amount of the dry magnesium hydroxide after the filtration.

Then, the obtained first magnesium hydroxide cake was subjected to repulping cleaning. In the repulping cleaning, pure water was first added in an amount of 40 times relative to the mass base amount of the dry magnesium hydroxide to obtain a second magnesium hydroxide slurry. Then, the obtained second magnesium hydroxide slurry was stirred at room temperature using a stirring machine at a rotational speed of 500 rpm for one hour, and further the second magnesium hydroxide slurry obtained after the stirring was subjected to filtration using filter paper, and pure water in an amount of 20 times relative to the mass base amount of the dry magnesium hydroxide was added to the slurry obtained after the filtration to wash the slurry with water, obtaining a second magnesium hydroxide cake. A cycle of the above-mentioned repulping cleaning was repeated 10 times to obtain a high-parity magnesium hydroxide cake. A portion of the high-parity magnesium hydroxide cake was dried to obtain high-purity magnesium hydroxide, and an impurity analysis was made with respect to the obtained high-purity magnesium hydroxide. The high-purity magnesium hydroxide was found to contain chlorine in an amount of 124 ppm by mass. Further, the high-purity magnesium hydroxide was found to have a purity of more than 99.9% by mass (>99.9% by mass).

The high-purity magnesium hydroxide cake was dehydrated and roughly crushed and then, placed in an electric furnace and the temperature in an air atmosphere in the furnace was increased to 1,200° C. at a temperature elevation rate of 6° C./minute. After the temperature elevation, the magnesium hydroxide was calcined at 1,200° C. for one hour to obtain a magnesium oxide powder in Example 1.

Example 2

Magnesium oxide in a powder form (Example 2) was produced in substantially the same manner as in Example 1 except that the number of the repetition of the repulping cleaning was changed to 5 (times).

Example 3

Magnesium oxide in a powder form (Example 3) was produced in substantially the same manner as in Example 1 except that the calcination temperature was changed to 500° C.

Example 4

Magnesium oxide in a powder form (Example 4) was produced in substantially the same manner as in Example 1 except that the calcination temperature was changed to 600° C.

Example 5

Magnesium oxide in a powder form (Example 5) was produced in substantially the same manner as in Example 1 except that the calcination temperature was changed to 800° C.

Example 6

Magnesium oxide in a powder form (Example 6) was produced in substantially the same manner as in Example 1 except that the calcination temperature was changed to 1,000° C.

Example 7

Magnesium oxide in a powder form (Example 7) was produced in substantially the same manner as in Example 1 except that the calcination temperature was changed to 1,300° C.

Example 8

Magnesium oxide in a powder form (Example 3) was produced in substantially the same manner as in Example 1 except that the average particle diameter ($D_{50}$) of the magnesium hydroxide particles was changed to 0.4 μm, and that the calcination temperature was changed to 1,0000° C.

Example 9

Magnesium oxide in a powder form (Example 9) was produced in substantially the same manner as in Example 1 except that the average particle diameter ($D_{50}$) of the magnesium hydroxide particles was changed to 1.4 μm, and that the calcination temperature was changed to 1,000° C.

Comparative Example 1

Magnesium oxide in a powder form (Comparative Example 1) was produced in substantially the same manner as in Example 1 except that the repulping cleaning was not performed.

Comparative Example 2

Magnesium oxide in a powder form (Comparative Example 2) was produced in substantially the same manner as in Comparative Example 1 except that the amount of the pure water used in the washing with water and filtration was changed to an amount of 10 times relative to the mass base amount of the dry magnesium hydroxide.

Comparative Example 3

Magnesium oxide in a powder form (Comparative Example 3) was produced in substantially the same manner as in Comparative Example 1 except that the hydrothermal-treated magnesium hydroxide slurry was subjected only to filtration and was not subjected to repining cleaning.

Comparative Example 4

Magnesium oxide in a powder form (Comparative Example 4) was produced in substantially the same manner as in Example 1 except that the calcination temperature was changed to 1,400° C.

Comparative Example 5

Magnesium oxide in a powder form (Comparative Example 5) was produced in substantially the same manner as in Example 1 except that the magnesium hydroxide particles as a raw material contained boron in an amount of 1,000 ppm by mass.

Results

As seen in Table 1, all of the magnesium oxide powders in Examples 1 to 9 had a BET specific surface area of 5 m²/g or more. In contract, all of the magnesium oxide powders in Comparative Examples 1 to 5 had a BET specific surface area of less than 5 m²/g.

Further, as seen in Table 1, all of the magnesium oxide powders in Examples 1 to 9 had a cumulative 50% particle diameter ($D_{50}$) obtained in the measurement of laser diffraction scattering particle size distribution in the range of from 0.3 to 1.5 μm. In contract, the magnesium oxide powders in Comparative Examples 2 to 5 had a cumulative 50% particle diameter ($D_{50}$) of more than 1.5 μm.

Furthermore, as seen in Table 1, all of the magnesium oxide powders in Examples 1 to 9 had a $D_{90}/D_{10}$ ratio of 5 or less. In contract, the magnesium oxide powders in Comparative Examples 4 and 5 had a $D_{90}/D_{10}$ ratio of more than 5.

TABLE 1

| | High-purity magnesium hydroxide (Raw material for magnesium oxide powder) | | | | | | | Magnesium oxide powder | |
|---|---|---|---|---|---|---|---|---|---|
| | BET Specific surface area (m²/g) | Particle diameter $D_{50}$ (μm) | Purity (% by mass) | Cl Content (ppm by mass) | B Content (ppm by mass) | Calcination Temperature (°C.) | Time (h) | BET Specific surface area (m²/g) | Cl Content (ppm by mass) |
| Example 1 | 5.23 | 0.9 | >99.9 | 124 | <1 | 1200 | 1 | 18.56 | 124 |
| Example 2 | 4.30 | 1.1 | >99.9 | 231 | <1 | 1200 | 1 | 16.02 | 231 |
| Example 3 | 5.23 | 0.9 | >99.9 | 124 | <1 | 500 | 1 | 139.00 | 124 |
| Example 4 | 5.23 | 0.9 | >99.9 | 124 | <1 | 600 | 1 | 121.30 | 170 |
| Example 5 | 5.23 | 0.9 | >99.9 | 124 | <1 | 800 | 1 | 39.34 | 179 |
| Example 6 | 5.23 | 0.9 | >99.9 | 124 | <1 | 1000 | 1 | 24.66 | 162 |
| Example 7 | 5.23 | 0.9 | >99.9 | 124 | <1 | 1300 | 1 | 15.21 | 92 |
| Example 8 | 7.96 | 0.4 | >99.9 | 94 | <1 | 1000 | 1 | 13.23 | 160 |
| Example 9 | 3.47 | 1.4 | >99.9 | 151 | <1 | 1000 | 1 | 27.49 | 151 |
| Comparative Example 1 | 5.23 | 0.9 | >99.9 | 805 | <1 | 1200 | 1 | 4.75 | 25 |
| Comparative Example 2 | 5.23 | 0.9 | >99.9 | 1928 | <1 | 1200 | 1 | 1.48 | 776 |
| Comparative Example 3 | 3.53 | 1.3 | >99.9 | 86341 | <1 | 1200 | 1 | 0.80 | 867 |
| Comparative Example 4 | 5.23 | 0.9 | >99.9 | 124 | <1 | 1400 | 1 | 3.41 | 160 |
| Comparative Example 5 | 5.23 | 0.9 | 99.9 | 121 | 1000 | 1200 | 1 | 3.59 | 14 |

| | Magnesium oxide powder | | | | | | | |
|---|---|---|---|---|---|---|---|---|
| | Particle diameter | | | Particle size distribution | Value of half width | | | Activity |
| | D10 | D60 | D90 | D90/D10 | (111) | (200) | (220) | (seconds) |
| Example 1 | 0.5 | 1.1 | 2.2 | 4.40 | 0.22 | 0.25 | 0.262 | 427 |
| Example 2 | 0.5 | 1.4 | 2.4 | 4.80 | 0.22 | 0.25 | 0.249 | 159 |
| Example 3 | 0.5 | 1.0 | 1.8 | 3.45 | 0.48 | 0.86 | 0.81 | 53 |
| Example 4 | 0.5 | 0.9 | 1.8 | 3.46 | 0.60 | 0.69 | 0.776 | 52 |
| Example 5 | 0.5 | 0.9 | 1.8 | 3.42 | 0.31 | 0.35 | 0.419 | 82 |
| Example 6 | 0.5 | 0.9 | 1.7 | 3.24 | 0.22 | 0.24 | 0.23 | 320 |
| Example 7 | 0.6 | 1.3 | 2.4 | 4.00 | 0.20 | 0.21 | 0.22 | 480 |
| Example 8 | 0.2 | 0.4 | 0.8 | 3.43 | 0.25 | 0.28 | 0.323 | 182 |
| Example 9 | 0.7 | 1.3 | 2.2 | 3.39 | 0.25 | 0.28 | 0.328 | 111 |
| Comparative Example 1 | 0.6 | 1.4 | 2.7 | 4.50 | 0.13 | 0.12 | 0.132 | 2130 |
| Comparative Example 2 | 1.1 | 2.9 | 4.6 | 4.20 | 0.13 | 0.13 | 0.132 | 2748 |
| Comparative Example 3 | 2.7 | 4.8 | 8.0 | 2.96 | 0.13 | 0.13 | 0.134 | 4071 |
| Comparative Example 4 | 0.6 | 1.9 | 3.3 | 5.50 | 0.21 | 0.22 | 0..231 | 620 |
| Comparative Example 5 | 0.6 | 2.3 | 12.3 | 20.58 | 0.31 | 0.35 | 0.419 | 301 |

The invention claimed is:
1. A method for producing a magnesium oxide powder, comprising the steps:
(A) providing a purified magnesium hydroxide slurry;
(B) maintaining the purified magnesium hydroxide slurry at a temperature of 50 to 200° C. while stirring of 0.5 to 4 hours to perform a heat stirring treatment;
(C) subjecting the heat stirring-treated first magnesium hydroxide slurry to filtration and washing with water to obtain a first magnesium hydroxide cake;
(D) adding to the first magnesium hydroxide cake pure water in an amount of 5 to 100 times relative to the mass base amount of a dry magnesium hydroxide contained in the first magnesium hydroxide cake, and stirring the cake in the pure water to prepare a second magnesium hydroxide slurry, and subjecting the second magnesium hydroxide slurry to filtration and washing with water to obtain a second magnesium hydroxide cake;
(E) repeating the step (D) further 1 to 20 times using the second magnesium hydroxide cake as a starting material instead of the first magnesium hydroxide cake to obtain a high-purity magnesium hydroxide cake;
(F) dehydrating the high-purity magnesium hydroxide cake to obtain high-purity magnesium hydroxide wherein the high-purity magnesium hydroxide has a purity of 99.9% by mass or more and contains chlorine in an amount of 500 ppm by mass or less; and
(G) increasing the temperature of the high-purity magnesium hydroxide in an air atmosphere at a temperature elevation rate of 2 to 20° C./minute and calcining the high-purity magnesium hydroxide at 500 to 1,500° C. for 0.2 to 5 hours to obtain a magnesium oxide powder.

2. The method according to claim 1, wherein the purified magnesium hydroxide slurry in the step (A) is produced by a method comprising the steps:
providing an aqueous solution of magnesium chloride;
adding an aqueous alkali solution to the aqueous solution of magnesium chloride so that the reaction rate of magnesium chloride becomes 5 to 30 mol % and effecting a reaction to obtain a slurry comprising magnesium hydroxide and other impurities;
adding a coagulant to the slurry comprising magnesium hydroxide and other impurities and subjecting or causing the magnesium hydroxide containing and having adsorbed the impurities to filtration or to coagulation settling to obtain an aqueous solution of purified magnesium chloride in the form of a filtrate or a supernatant; and
adding an aqueous alkali solution to the aqueous solution of purified magnesium chloride so that the reaction rate of magnesium chloride becomes 50 to 100 mol % and effecting a reaction to obtain the purified magnesium hydroxide slurry.

* * * * *